United States Patent [19]

Christol

[11] Patent Number: 4,899,618
[45] Date of Patent: Feb. 13, 1990

[54] PEDALING UNIT FOR A BICYCLE

[75] Inventor: Lilian Christol, Clermont L'Herault, France

[73] Assignee: Societe Manoel Bouchet, S.A., Ladoix Serringny, France; a part interest

[21] Appl. No.: 240,914

[22] Filed: Sep. 6, 1988

[30] Foreign Application Priority Data

Sep. 10, 1987 [FR] France .................. 87 12541

[51] Int. Cl.$^4$ .................. G05G 1/14; B62M 3/08
[52] U.S. Cl. .................. 74/594.6; 74/594.4; 36/131
[58] Field of Search .................. 74/594.6, 594.7, 594.4, 74/560; 36/131; 280/613, 614, 615, 11.3, 11.31

[56] References Cited

U.S. PATENT DOCUMENTS

| | | | |
|---|---|---|---|
| 576,548 | 2/1897 | Cassidy | 74/594.6 |
| 4,089,236 | 5/1978 | Genzling | 74/594.6 |
| 4,488,453 | 12/1984 | Drugeon | 74/594.6 |
| 4,738,158 | 4/1988 | Christol | 74/560 |

FOREIGN PATENT DOCUMENTS

| | | | |
|---|---|---|---|
| 3135345 | 3/1983 | Fed. Rep. of Germany | 36/131 |
| 3426103 | 1/1986 | Fed. Rep. of Germany | 74/594.6 |
| 993958 | 11/1951 | France | 74/594.6 |
| 1669 | 1/1894 | United Kingdom | 74/594.6 |

Primary Examiner—Gary L. Smith
Assistant Examiner—Flemming Saether
Attorney, Agent, or Firm—Browdy and Neimark

[57] ABSTRACT

A pedaling unit for a bicycle, including a footplate which includes two lateral guides in a V-shaped open toward the rear and which is fastened to a support mounted on the pedal crank of the crankset, as well as a special shoe which includes lateral grooves working with the guides of the footplate, this unit further including a system for locking the shoe with respect to the footplate in the longitudinal direction. The pedaling unit is characterized in that its footplate is made in two parts, each of which includes only one of guides of the footplates and which can mutually pivot while staying in the same plane, in opposition to elastic return device and with the opening of the branches of the V formed by the guides. the unit has application in the field of racing bicycles.

10 Claims, 2 Drawing Sheets

PEDALING UNIT FOR A BICYCLE

BACKGROUND OF THE INVENTION

1. Field of the Invention

The present invention relates to a pedaling unit for a racing bicycle and, more specifically, to a unit comprising a pedaling footplate that is mounted on the pedal crank of the crankset and a special shoe that works with this footplate to keep the foot of the racer solidly connected to the footplate, but so as to be able to be released easily and rapidly if need be.

2. The Prior Art

Except for toe clips of varied shapes, pedaling units are known whose footplate is equipped with lateral, stationary guides that are to be inserted into corresponding lateral channels or grooves of the shoe or that work with lateral flaps mounted on the shoe, while a latch can protrude above the footplate and, perpendicular to it, with the action of a hand lever, be inserted into an opposite opening placed in the sole of the shoe and longitudinally lock the shoe, which can be released by retraction of the latch and by sliding the edges of the sole toward the rear in the lateral guides of the footplate.

Such a device is described in French Pat. No. 82/08222, and its operation is very satisfactory, but it nevertheless exhibits a certain number of drawbacks, such as the fact that a hand lever must be actuated for the racer to be able to release his foot, or again the presence in the sole of the shoe of the small hole intended to receive the locking latch of the device, and in which foreign bodies can come to be lodged, such as pebbles, which lock the mechanism when it is desired to make it operate again.

SUMMARY OF THE INVENTION

The object of this invention is also to propose a pedaling unit of the type in which the footplate mounted on the pedal crank of the crankset comprises two lateral guides in a V shape open toward the rear, working with grooves made in the edges of the sole of the special shoe the cyclist is wearing, this unit further comprising means of locking the shoe with respect to the footplate in the longitudinal direction, but reducing the difficulties mentioned above of the known devices, being still simpler than the pedaling unit of French Pat. No. 82/08222 specified above and being reliable and easy to use.

According to the invention, these objects and others which will subsequently appear are achieved due to a pedaling unit of the type specified above, which is characterized by the fact that its footplate is made in two parts, each of which comprises only one of the guides of this footplate and which can mutually pivot while staying in the same plane, in opposition to elastic return means and with opening of the branches of the V formed by the guides.

It will be seen that, because of these arrangements, it suffices for the user of the pedaling unit according to the invention, when he wants to lock the shoe with the footplate, to make the sole slide on the footplate while pushing his foot forward. The guides of the footplate engage in the grooves of the sole, while the branches of the V formed by the guides open toward the outside in opposition to elastic return means. At the end of the race, the longitudinal locking means specified above go into action to prevent the guides of the footplate from exiting the corresponding grooves of the sole by simply sliding the foot toward the rear. It is seen that thus the user can lock his shoe in any direction in the simplest manner possible, and without being required to operate any hand lever, with a movement of the foot that is as natural as possible.

When he wants to release his shoe, the cyclist makes it pivot laterally to force the corresponding guide back toward the outside, which simultaneously pushes aside the opposite guide of the groove in which it is engaged. The sole thus released, it is then sufficient, to free the foot completely, for the user to move his foot toward the rear while keeping the guide toward the outside. The guides then again assume their initial position under the effect of the elastic return means. This release movement is extremely simple and rapid, such that it very quickly becomes a sort of reflex, which allows, if need be, rapid bracing on the ground to avoid any risk of accident.

According to an advantageous embodiment of this pedaling unit according to this invention, the embodiment of the parts of the footplate of the device that is turned toward the pedal crank of the crankset is mounted in a stationary manner on the support that is solidly connected with this pedal crank, and it comprises a pin that is approximately perpendicular to its plane, around which the other, outside, part of the footplate can pivot.

In this case, the footplate thus comprises an inner part that is stationary with respect to the support and an outer pivoting part which, in the following, will be respectively called "stationary part" and "pivoting part" and, evidently, it is the guide of the latter which the foot of the cyclist moves toward the outside to release himself. The arrangement just described facilitates the release of the shoe; the latter, actually, is not impeded in its lateral movement by the various bicycle components.

Advantageously, the pivoting part of the footplate of the invention consists essentially of a plate inserted between its stationary part and the support mounted on the pedal crank of the crankset.

Here also elastic means are preferably inserted that allow the pivoting part of the footplate to return toward the stationary part, with closure of the V formed by the corresponding guides. Advantageously, these elastic means consist of a compression spring in the shape of a U, one of whose branches is supported toward the outside on a stop that is solidly connected with the stationary part of the footplate, the end of its other branch being fastened to the pivoting part of this footplate to return it toward its stationary part.

Further, the pedaling unit according to this invention advantageously comprises means of mutually catching the two parts, stationary and pivoting, of the footplate when their guides are in closed position confining the shoe, these means automatically retracting during the opening of these guides at the moment when they go toward their position of releasing the shoe.

Thus, to release the foot from the footplate, it is necessary that the foot of the user exert for an instant a lateral force greater than that of the return spring, which eliminates the risks of untimely release.

According to an advantageous embodiment of these catching means, they comprise a beveled pin which is mounted to slide in a barrel solidly connected with the stationary part of the footplate and which is pushed by a compression spring into a notch of a corresponding shape made on the periphery of the pivoting part of the footplate. Under these circumstances, it can be seen that a force exerted to make the latter pivot retracts the beveled pin in opposition to the spring by sliding on the edges of the notch in which it penetrates, then on the periphery of the pivoting part of the footplate.

The supporting force of this beveled pin on the periphery of the pivoting part of the footplate, and thus the difficulty of the pivoting, are preferably able to be regulated due to the fact that the compression spring specified above is housed in its barrel between the head of the beveled pin and a threaded plug that is screwed into the barrel to a depth that can be regulated.

It will be noted with interest that, because of the arrangements described above, during pedaling the user obtains an angular movement of the foot on the footplate due to a slight wobble of the guide toward the exterior, as long as the force of the rotational movement of his foot is not greater than that of the return spring. Thus the foot can assume a natural position while automatically correcting a possible angular adjustment error of the footplate on its support, without compromising the pedaling efficiency.

With respect to the means specified above for locking the shoe with respect to the footplate in the longitudinal direction, the means can consist very simply in the fact that the length of their grooves is hardly greater than that of the guides of the footplate.

However, it is also possible to provide grooves that are markedly longer than the guides but to provide the unit with reciprocal catching means such as, for example, a notch present on each guide and working with an appropriately shaped hollow on the bottom of the corresponding groove, due to the natural elasticity of the sole in the zone of the hollow.

Preferably, the pedaling unit according to the invention comprises means for adjusting the angular and longitudinal position of its footplate with respect to the support, which is mounted on the pedal crank of the crankset, and for locking it in the position selected. It is evident that this arrangement markedly increases the comfort of the user and the efficiency of his efforts, since the device of the invention can thus be easily adapted to his form.

According to an advantageous embodiment of these adjustment means, the footplate of the device is fastened on its support by one front screw and two rear screws of the footplate which pass through holes of the footplate and go into elongated slots of the support, the slot of the front screw being longitudinal and stationary, while the rear slots are placed in disks that are able, before locking the corresponding screws, to turn in appropriate recesses of the same support.

If the disks in which the rear slots are made are made to turn so as to bring the slots to be longitudinal, as is the front slot, the footplate can be moved in the longitudinal direction with respect to the support and locked in the desired position by the screws specified above.

On the contrary, if the rear slots are brought to be crosswise to the front slot, the footplate can be made to pivot with respect to the front screw, thus providing the angular adjustment. Of course, the combination of longitudinal and angular movements is possible when the rear slots are placed obliquely to the front slot.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The following description, which does not exhibit any limiting character, allows good understanding as to how this invention can be implemented. It should be read with reference to the accompanying drawings, of which.

DETAILED DESCRIPTION OF THE PREFERRED EMBODIMENT

Figure 1:
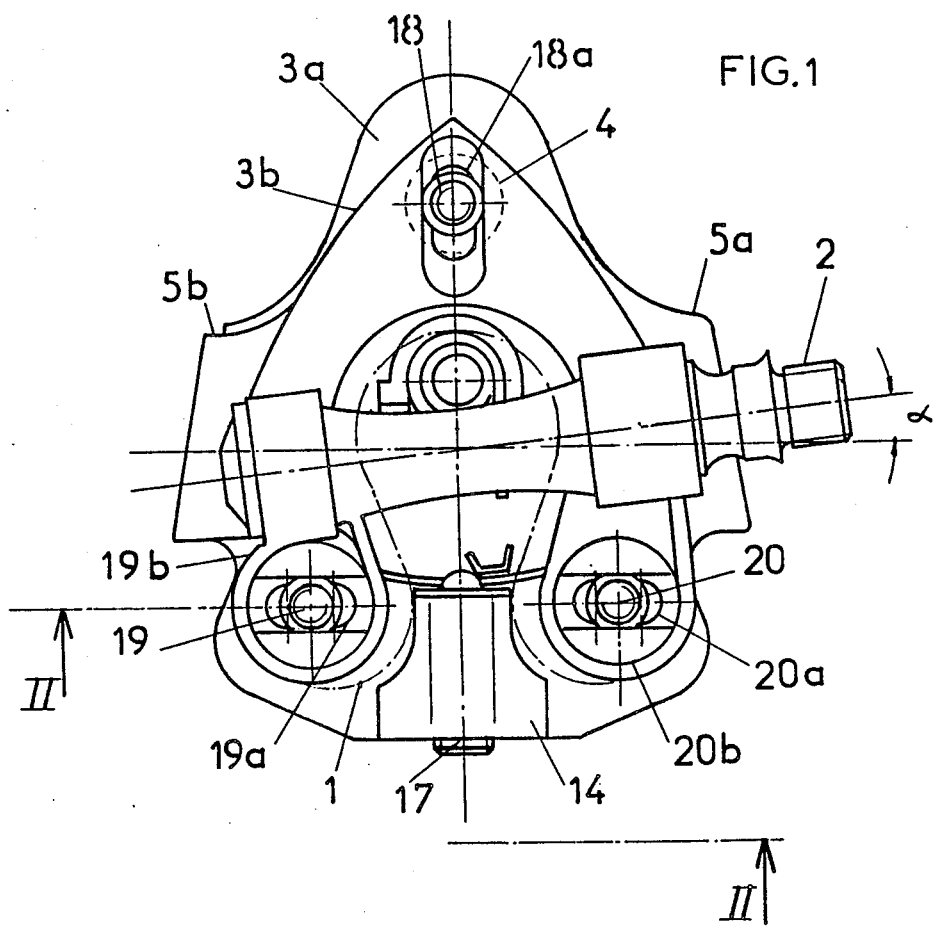
FIG. 1 represents a bottom view of the pedaling footplate according to this invention and of the support which connects it to the pedal crank of the crankset.
Figure 2:
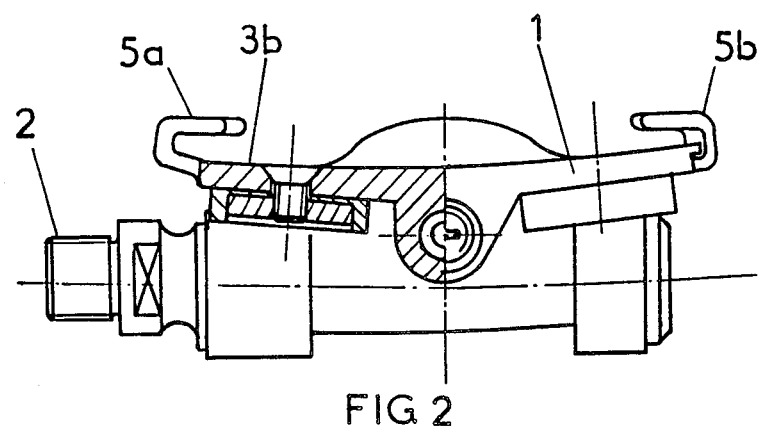
FIG. 2 shows a view in a diagrammatic cut of the object of FIG. 1, taken along line II—II.

Below, it will be assumed that the pedaling unit of the invention is located in its normal position of use, which places expressions such as "above" or "vertical" in context.

This being the case, and as is seen in the figures, the pedaling unit of the invention comprises a support 1 integrated in a pin that is fastened to pedal crank 2 of a crankset and on which is screwed a footplate designated in its entirety by reference 3. The latter consists of two parts made in the form of plates, namely one upper, stationary part 3a and a pivoting part 3b that is housed in a space made between support 1 and stationary part 3a and that can turn within certain limits toward the outside of the device by sliding in its same generally horizontal plane, around a pin 4 that is solidly connected with stationary part 3a of footplate 3.

Figure 4:
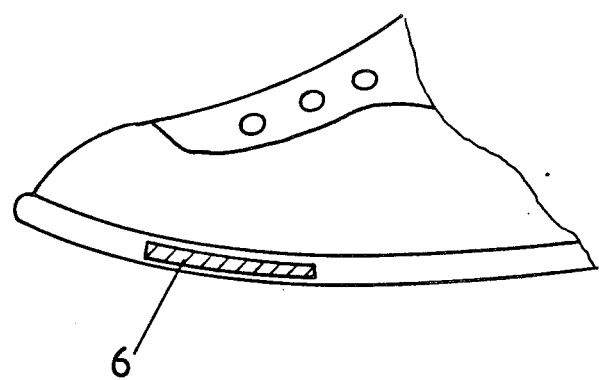
FIG. 4 shows a diagrammatic side view of the special shoe which, according to the invention, works with the device of FIG. 1.

On their outside edges, stationary parts 3a and pivoting parts 3b each extend upward by a guide 5a and 5b, respectively, whose top is bent inward to be able to be inserted into a suitable groove 6 (FIG. 4) made in the side of the special sole used according to the invention.

Figure 3:
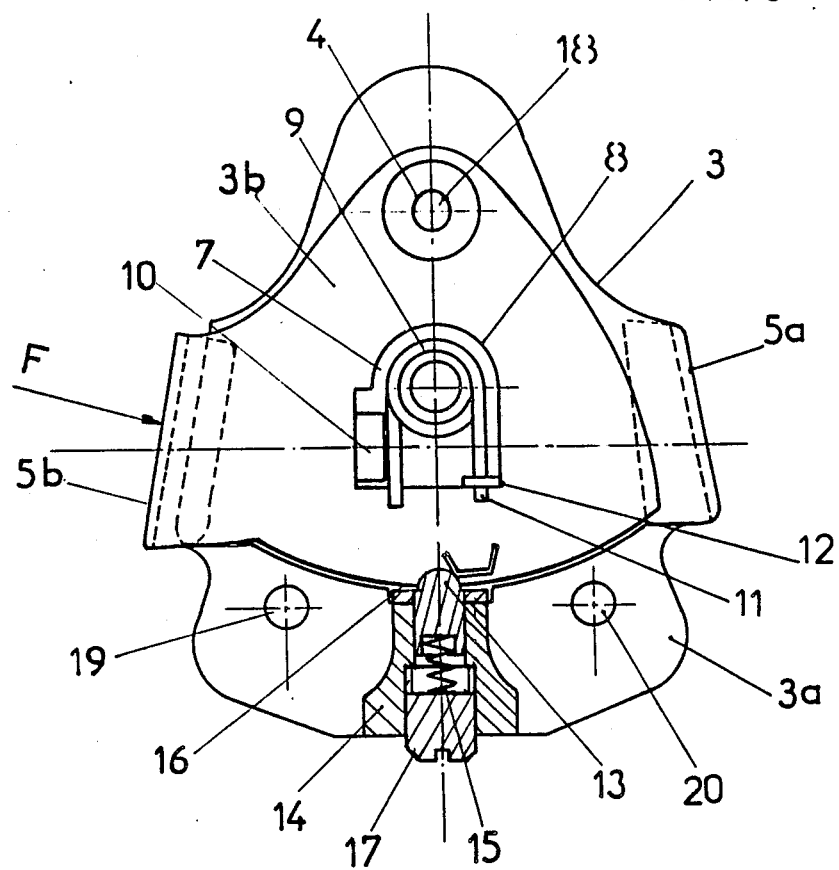
FIG. 3 represents a bottom view of the pedaling footplate of FIG. 1 without its support.

In an opening 7 made in the center of pivoting part 3b of footplate 3 (FIG. 3), the central loop of a compression spring 8 in the shape of a U passes over a pin 9 that is solidly connected with stationary part 3a of footplate 3, near its center, and one of its branches rests on a stop 10 that is solidly connected with the same stationary part 3a. The end of its other branch goes into an opening 11 made in an edge 12 of opening 7 and thus pushes it, at the same time as it pushes pivoting guide 5b, which is solidly connected with it, toward guide 5a of stationary part 3a (arrow F). The result is that spring 8 tends to close, by pivoting around pin 4, the branches of the V formed by guides 5a and 5b and to make guides 5a and 5b enter grooves 6 of the shoe of the user.

If the length of each guide 5a, 5b, or, more precisely, that of their upper edge bent toward the inside of the device, is approximately equal to that of grooves 6 of the shoe in which they penetrate, it is clear that the latter are locked in the longitudinal direction, besides vertically and laterally, with respect to footplate 3. As said above, it is still possible to give a greater length to grooves 6 and to provide longitudinal locking devices.

The operating method of this device, with respect to locking and to release, was described above in a detailed manner, and will not be taken up again here.

This pedaling unit according to the invention can comprise a mutual catching of stationary part 3a and stationary part 3b of footplate 3 when the footplate is in a shoe-locking position. This device comprises a beveled pin 13 that can slide into a barrel 14 that is solidly connected with stationary part 3a and that is pushed by a compression spring 15 into a notch 16 of a suitable shape made on the periphery of pivoting part 3b of footplate 3. More precisely, spring 15 is housed in barrel 14 between pin 13 and a threaded plug 17 which, more or less screwed into the free end of barrel 14, compresses spring 15 more or less and consequently adjusts the tightness of the bevel of pin 13 in notch 16. It is clear that if pivoting part 3b of footplate 3 is made to turn in the direction opposite arrow F, the sliding of the side of pin 13 on that of notch 16 again pushes the pin into barrel 14. It then passes along the periphery of part 3b and the catching effect is eliminated.

Fastening of footplate 3 according to the invention on support 1, which is mounted on pedal crank 2 of the crankset, as well as the adjustment of their respective angular and longitudinal positions, are performed by three screws put into suitable holes of footplate 3: one, 18, near pivoting pin 4 and two others, 19 and 20, symmetrically with respect to the axis of the device behind them.

In support 1, screws 18, 19 and 20 go respectively into elongated slots 18a, 19a and 20a, the first of which, stationary, extends in the longitudinal direction, while each of the other two is made in a disk, 19b and 20b respectively, which can turn in a corresponding recess exhibited by support 1.

It is easily understood that if disks 19b and 20b are made to turn so as to bring corresponding slots 19a and 20a to be longitudinal as is front slot 18a, footplate 3 can be moved with respect to support 1 in the longitudinal direction over a distance equal to the length of the slots involved. It then suffices to lock screws 18, 19 and 20 to fasten footplate 3 in the position that has been selected, thus providing the longitudinal adjustment of the latter.

If, on the contrary, turning slots 19a and 20a are placed at obliquely with respect to longitudinal slot 18a, footplate 3 pivots around screw 18, which passes through the footplate and which further moves more or less in the longitudinal direction, like the footplate, as a function of the inclination of slots 19a and 20a. In the extreme case where the latter are crosswise, the footplate pivots, without longitudinal movement, by an angle alpha (FIG. 1), which is limited only by the length of slots 19a and 20a. Thus, the angular adjustment of the position of footplate 3 with respect to support 1 is provided.

Without going outside the scope of this invention, it is possible to make various modifications to the embodiments that have just been described. Thus, the return force of pivoting guide 5b toward stationary guide 5a could be adjusted by modifying the anchoring point of at least one of the legs of spring 8.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

I claim:

1. A pedaling unit for a bicycle comprising a pedal crank and a crankset, for use with a shoe having a special sole that comprises a lateral groove on each side of the sole, said unit comprising:

a support mounted on said pedal crank;

a footplate which comprises two lateral guides extending along the branches of a V open toward the rear, each of said lateral guides being adapted to engage with the corresponding lateral groove of said sole;

said footplate comprising a first part which is mounted stationary on said support and which bears the one of said lateral guides which is the nearest to said pedal crank, and a second part which is pivotally mounted with respect to said first part around an axis approximately perpendicular to said first part and which bears the other one of said lateral guides; and means for locking the shoe with respect to said footplate in the longitudinal direction;

characterized in that it further comprises elastic return means for urging said second part of the footplate to pivot around said axis towards the lateral guide which is borne by said first plate of the footplate.

2. The pedaling unit according to claim 1, wherein said second part of a said footplate comprises a plate inserted between said first part and said support.

3. The pedaling unit according to claim 1, wherein said elastic return means consist of an elastic member in the shape of a U, one of whose branches rests toward the outside on a stop, solidly connected with said first part of said footplate, a free end of its other branch being fastened to said second part of said footplate to return said second part toward said first part.

4. The pedaling unit according to claim 1, further comprising means for mutually catching said two parts, of said footplate when their guides are in a closed position confining the shoe, said means automatically retracting when the guides are opened at the moment the guides go toward an open position for releasing the shoe.

5. The pedaling unit according to claim 4, wherein said catching means comprises a beveled pin which is mounted to slide into a barrel solidly connected with said first part of said footplate and which is pushed by a second compression spring into a notch of a suitable shape made on the periphery of said second part.

6. The pedaling unit according to claim 5, wherein said second compression spring is housed in said barrel between the head of said beveled pin and a threaded plug screwed to an adjustable depth in said barrel.

7. The pedaling unit according to claim 1, wherein the length of the lateral grooves of the special sole of the shoe is slightly greater than that of said guides of said footplate to lock the shoe with respect to the footplate in the longitudinal direction.

8. The pedaling unit according to claim 1, further comprising means for adjusting the angular and longitudinal position of said footplate with respect to said support, wherein said footplate is fastened to said support by a front screw and two rear screws which pass through holes in said footplate and go into elongated slots of said support, a slot for said front screw being longitudinally oriented and stationary, and two other slots for said rear screws being made in disks and able to turn, before locking the corresponding screws, in appropriate recesses of said support.

9. A pedaling unit for a bicycle, said unit comprising:
a footplate which comprises two lateral guides in a V-shape open toward the rear, said footplate being fastened to a support mounted on a pedal crank of a crankset, and said lateral guides being adapted to engage with lateral grooves of a shoe having a special sole with lateral grooves on each side of the sole;
means for locking the shoe with respect to said footplate in the longitudinal direction;
said footplate comprising a first stationary part and a second moveable part, each of which comprises only one of said guides of said footplate and wherein said second moveable part can pivot about a generally vertical axis while staying in the same generally horizontal plane;
elastic return means for biasing said second moveable part toward said first stationary part, said elastic return means comprising a generally U-shaped compression spring having a first leg resting toward the outside on a stop, solidly connected with said first stationary part, and a free end of a second leg of said generally U-shaped compression spring being fastened to said second moveable part; and
wherein the branches of the V formed by said guides are opened.

10. A pedaling unit for a bicycle, said unit comprising:
a footplate which comprises two lateral guides in a V-shape open toward the rear, said footplate being fastened to a support mounted on a pedal crank of a crankset, and said lateral guides being adapted to engage with lateral grooves of a shoe having a special sole with the lateral grooves on each side of the sole;
means for locking the shoe with respect to said footplate in the longitudinal direction;
said footplate comprising a first stationary part and a second moveable part, each of which comprises only one of said guides of said footplate and wherein said second moveable part can pivot about a generally vertical axis while staying in the same generally horizontal plane;
elastic return means for biasing said guides toward one another;
locking means for mutually locking said first stationary part and said second moveable part against the action of said elastic return means when said guides are in a closed position confining the shoe, said locking means automatically retracting when the guides are opened at the moment the guides go toward an open position for releasing the shoe; and
wherein the branches of the V formed by said guides are opened.

* * * * *